United States Patent
Hestness et al.

(10) Patent No.: US 7,740,910 B2
(45) Date of Patent: Jun. 22, 2010

(54) METHOD FOR EPOXY APPLICATION CONTROL OVERPRESSES

(75) Inventors: Michael L. Hestness, Forth Worth, TX (US); Richard A. Luepke, Forth Worth, TX (US); Gregory S. McKee, Bedford, TX (US); Allen D. Mader, Haltom City, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 468 days.

(21) Appl. No.: 11/604,604

(22) Filed: Nov. 27, 2006

(65) Prior Publication Data

US 2008/0124471 A1    May 29, 2008

(51) Int. Cl.
  *B05D 3/12* (2006.01)
  *B29C 43/00* (2006.01)
  *B29C 43/10* (2006.01)
  *B29C 43/18* (2006.01)
  *B29C 70/00* (2006.01)
  *B29C 70/44* (2006.01)
  *B29C 70/74* (2006.01)

(52) U.S. Cl. .............................. 427/355; 156/1; 156/60; 156/228; 156/349; 264/257; 425/406

(58) Field of Classification Search ................... 427/355
  See application file for complete search history.

(56) References Cited

U.S. PATENT DOCUMENTS

| | | | | |
|---|---|---|---|---|
| 3,645,481 A | * | 2/1972 | Purdy | 244/123.5 |
| 5,209,935 A | * | 5/1993 | Jacino et al. | 425/12 |
| 5,435,959 A | * | 7/1995 | Williamson et al. | 264/221 |
| 5,902,535 A | * | 5/1999 | Burgess et al. | 264/257 |
| 6,416,312 B1 | * | 7/2002 | Gonser et al. | 425/525 |
| 2004/0173940 A1 | * | 9/2004 | Yuhara et al. | 264/259 |

FOREIGN PATENT DOCUMENTS

| | | |
|---|---|---|
| EP | 0 823 320 A1 | 2/1998 |
| EP | 823320 A1 * | 2/1998 |
| EP | 1 495 850 A1 | 1/2005 |
| EP | 1495850 A1 * | 1/2005 |
| GB | 2 154 286 A | 9/1985 |

* cited by examiner

*Primary Examiner*—Michael Kornakov
*Assistant Examiner*—Alexander Weddle
(74) *Attorney, Agent, or Firm*—Bracewell & Giuliani LLP

(57) ABSTRACT

A method for placing a resin layer or shim on a frame member uses an overpress. The overpress has an inner surface with protruding nubs. The operator places a bead of liquid resin on the inner surface of the overpress, then clamps the overpress to the frame member. The clamps force the nubs of the overpress into contact with the frame member and allows the nubs to define a clearance between the overpress and the frame member. The liquid resin spreads throughout the clearance and cures. After the resin has cured, the overpress is removed from the frame member, leaving a layer of cured resin bound to the frame member. This layer is then machined to a desired thickness.

20 Claims, 4 Drawing Sheets

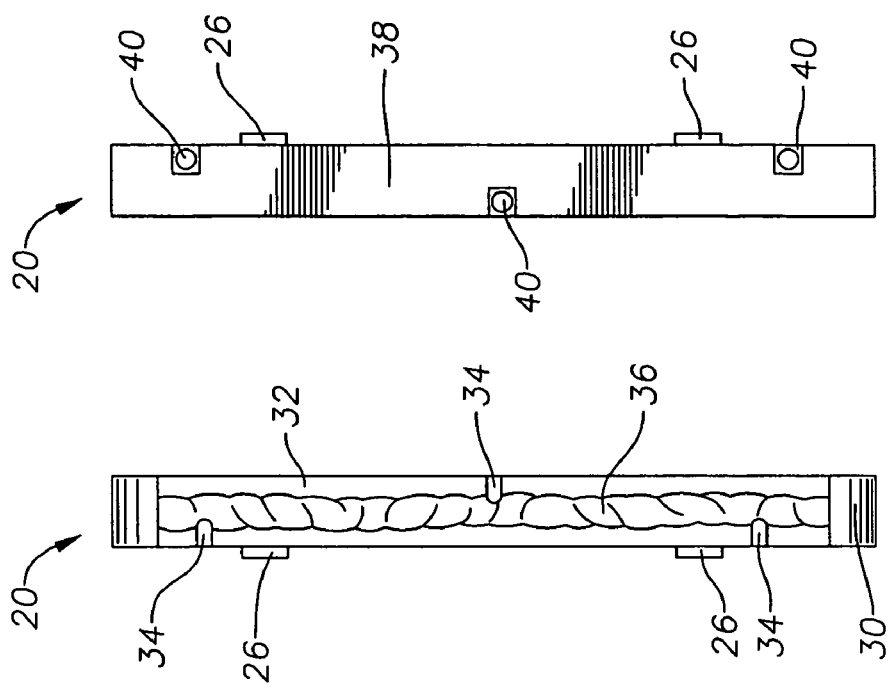
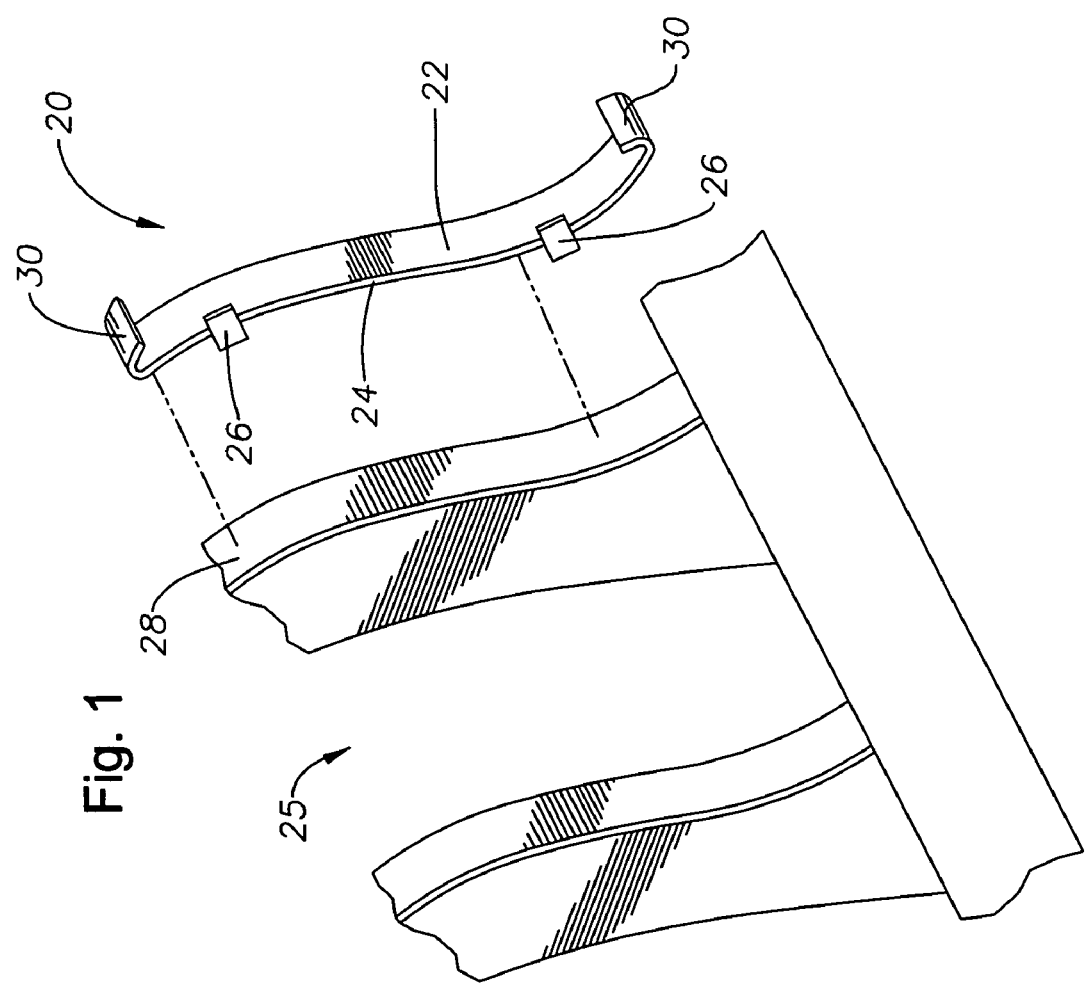
Fig. 1
Fig. 2
Fig. 3

METHOD FOR EPOXY APPLICATION CONTROL OVERPRESSES

BACKGROUND

1. Field of the Invention

This invention relates in general to the assembly of structural components, and specifically to the application of a resin layer or skin on the surface of a frame member.

2. Description of the Prior Art

In prior art methods, the assembly of an understructure of an aircraft is achieved by applying liquid resin to the surface of various components making up the aircraft's understructure to form a shim. The liquid resin is applied by hand directly to the aircraft understructure and is allowed to cure. Once the resin has cured, the entire understructure assembly is sent to a precision five-axis mill where the liquid resin is machined to precise profile tolerances which match the inner profile of the fuselage panels. Once machined, the fuselage panels are attached on top of the cured resin layer, which is often referred to as a shim.

There are many disadvantages to these methods. First, applying adequate liquid resin coverage to the surface of the understructure is highly important. Applying the resin by hand, however, often results in uneven resin coverage. Since the liquid resin forms a skin, or amine carbonate, when exposed to air, it is important to apply enough material to achieve the desired thickness the first time the resin is applied. If adequate resin is not applied to the understructure, the resin must be reworked. This process, however, is messy and labor-intensive, and the added resin may not develop the needed bond strength. In addition, if the thin areas of resin coverage are not discovered until after the cured resin has been machined, it is likely the resin will require an additional machining, which requires additional resin and will lead to longer construction times and higher costs.

The second disadvantage to the prior art method is that hand application often results in too much resin being applied. Applying too much resin results in wasted material, which is expensive. In addition, this requires more machining time because an increased number of machining passes is necessary to remove the unneeded resin which, again, adds unnecessary cost to the assembly process.

The third disadvantage to the prior art method is that hand application involves a high risk of air entrapment. Since the resin material is applied wet using a wooden tongue depressor, there is always a risk of creating air pockets while spreading the resin on the understructure surface. These air pockets reduce the structural properties of the cured resin and can be exposed later during the machining process requiring additional, and often difficult, repairs.

The fourth disadvantage to the prior art method is that it is difficult to apply the liquid resin in a vertical, or similar, attitude. Due to the viscosity of the liquid resin material in the wet uncured state, it is difficult, if not impossible, to apply the shim to an overhead structure because "slumping" of the material will occur. This results in an unacceptable surface which will require additional and costly reworking.

In addition, in prior art methods when the liquid resin is exposed to air during curing, there is an amine carbonate reaction caused by moisture in the air that causes the resin to form a skin. If this reaction occurs, the top surface of the cured resin must be removed using a laborious sanding process. Moreover, once the resin has been applied, the understructure must sit undisturbed for a minimum of five hours. During this time, the resin will be allowed to cure to a hardness capable of being handled. If, however, the understructure is disturbed during this time, there is a risk of disturbing the resin which will, once more, require costly manual reworking.

In view of the foregoing, the inventors of the present invention have realized the need for a less expensive, more efficient, and dependable method of understructure assembly.

SUMMARY OF THE INVENTION

In view of the foregoing, embodiments of the present invention beneficially provide methods for placing a resin layer on a selected surface of a frame member. The methods include providing an overpress having an inner surface with a plurality of nubs protruding therefrom, placing liquid resin on the overpress or frame member, forcing the nubs of the overpress in contact with the frame member, removing the overpress from the frame member after the resin has cured, and leaving the cured resin bound to the frame member. In an exemplary embodiment, the overpress is constructed using a translucent material, thereby allowing the liquid resin to be visible to ensure uniform coverage of the frame member surface. In addition, clamps can be used to secure the overpress to the frame member.

By providing the before mentioned methods, the present invention provides increased efficiency and dependability during assembly, thereby resulting in reduced assembly costs.

BRIEF DESCRIPTION OF THE DRAWINGS

Some of the features and benefits of the present invention having been stated, others will become apparent as the description proceeds when taken in conjunction with the accompanying drawings, in which:

FIG. 1 is an exploded perspective view of part of a frame member and overpress according to an embodiment of the present invention;

FIG. 2 is a perspective view of the inner surface of the overpress of FIG. 1;

FIG. 3 is a perspective view of the outer surface of the overpress of FIG. 2;

DETAILED DESCRIPTION OF THE INVENTION

Figure 4:
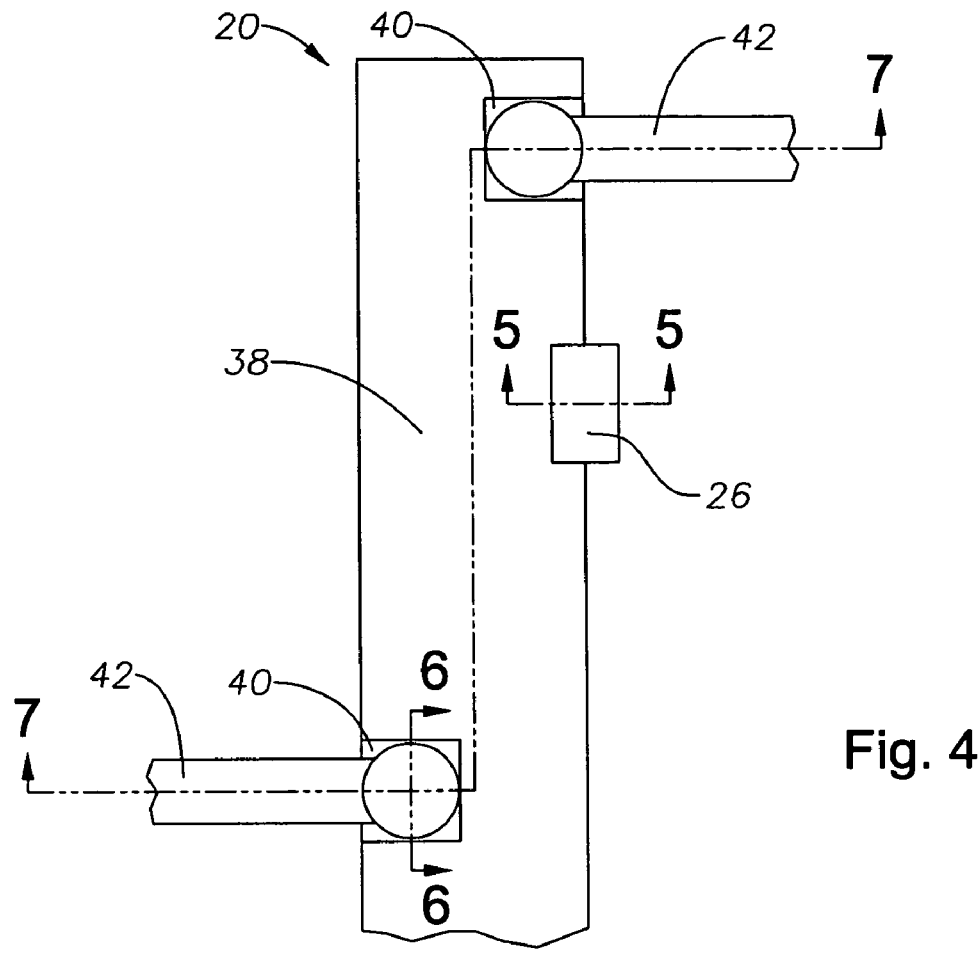
FIG. 4 is an enlarged view of part of the outer surface of the overpress of FIG. 2, shown clamped to the frame member of FIG. 1.

The present invention now will be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Referring to FIG. 1, an exemplary embodiment of the present invention is illustrated. Overpress 20 is shown being an elongated member constructed from a non-metallic material, such as cured resin that is substantially rigid and has an inner surface 32. Overpress 20 also has an outer surface 22 and two parallel lateral edges 24. Also illustrated is a frame member 25 having a frame member outer surface 28. Inner and outer surfaces 32, 28 are flat but may curve along their lengths in curvilinear fashion.

The shape of overpress inner surface 32 is substantially identical to the shape of frame member outer surface 22. Frame member surface 28 can take the form of any understructural component such as, for example, an aircraft or automobile understructure. Normally frame member 25 is metal, such as aluminum. Overpress 20 can take various forms to fit the shape of the frame member surface and remain within the spirit and scope of this invention.

A plurality of guide members 26 are formed transversely along one lateral edge 24 of overpress 20 in order to facilitate alignment of overpress 20 on frame member 25. When overpress 20 is placed against frame member surface 28, guide members 26 abut against the lateral edge, or flange, of frame member 25. Guide members 26, however, can be placed on each lateral edge if desired. A release member, here shown as pull tab 30, optionally may be located at each end of overpress 20. Pull tabs 30 form part of overpress 20 and extend upwardly and inwardly to form a substantially "c" shape, thus assisting one in pulling, or removing, overpress 20 from frame surface member 28. In the alternative, however, pull tabs 30 can take various forms, be located at various positions along overpress 20, or even be separate components used to remove overpress 20 from frame member surface 28. Moreover, other forms of release agents are used to assist the worker in removing overpress 20, such as a chemical agent applied to overpress inner surface 32.

Referring to FIG. 2, to ensure the applied liquid resin 36 thickness requirements are met, at least one nub 34 is formed on overpress inner surface 32. Each nub 34 protrudes the same distance outwardly from inner surface 32. The height, or offset, of nubs 34 is determined by the desired thickness of the cured resin 36. Nubs 34 may differ in shape, but preferably have tapered side walls or edges for ready removal of overpress 20 after resin 36 has cured. In FIGS. 1-7, each nub 34 is generally rectangular. In this embodiment, nubs 34 are placed along each lateral edge 24 and are staggered in relation to one another in order to provide clearance for a continuous band of resin, thereby preventing the possibility of a leak path created by a cold formed joint.

The locations of nubs 34 are designed so they will not trap air. As such, the length of nubs 34 extends from a lateral edge 24 inwardly to a distance that is less than the width of overpress 20. Therefore, when overpress 20 is removed from frame member surface 28, a hollow area will be left were each of the nubs 34 was located. However, the length of nubs 34 can be varied for unusual configurations. The hollow areas can be subsequently filled by epoxy or resin.

Also referring to FIG. 2, liquid resin 36 is illustrated being placed on overpress inner surface 32. However, in practice, liquid resin 36 can alternatively be placed on frame member surface 28. Before applying liquid resin 36, a release agent is applied to inner surface 32 to prevent liquid resin 36 from bonding to overpress 20. Preferably, liquid resin 36 is squeezed onto inner surface 32 by a delivering gun, forming a thick bead in the center, as shown in FIG. 2. When overpress 20 is clamped to frame member 28, the bead flattens and spreads throughout the clearance between frame member 28 and overpress inner surface 32.

Referring to FIGS. 3 and 4, spaced and staggered along the length of overpress outer surface 38 are indicators 40, which are located above nubs 34. Each indicator 40 is a slightly raised surface located on the opposite side from one of the nubs 34. In operation, once overpress 20 is placed on frame member 25, clamps 42, such as a "C-shape" or other type of clamp, are placed around overpress 20 and frame member 25 to secure overpress 20 to frame member 25. Indicators 40 inform the worker where to place the legs of clamps 42. Placing each indicator 40 opposite one of the nubs 34 prevents the clamps 42 from being placed elsewhere along overpress 20 which may result in the depression of overpress inner surface 32 directly into contact with frame member surface 22, thereby causing uneven distribution of liquid resin 36. When properly placed on indicators 40, the clamp force passes directly through one of the nubs 34.

Optionally, overpress 20 can be formed using a translucent resin material and a colored liquid resin 36 can be used. When used in conjunction with each other, this will allow the worker to visually perceive through overpress 20 whether liquid resin 36 has completely covered frame member surface 28 before it is allowed to cure. In the alternative, liquid resin 36 could also be treated with chemicals which may allow it to glow or otherwise be perceived through overpress 20.

Figure 5:
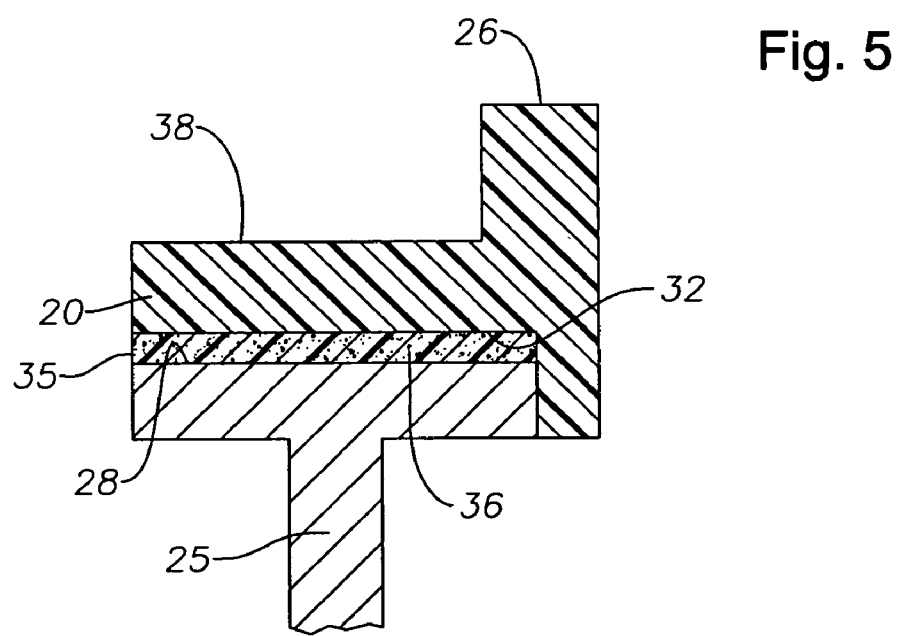
FIG. 5 is a sectional view of the overpress and frame of FIG. 1, taken along line 5-5 of FIG. 4.
Figure 6:
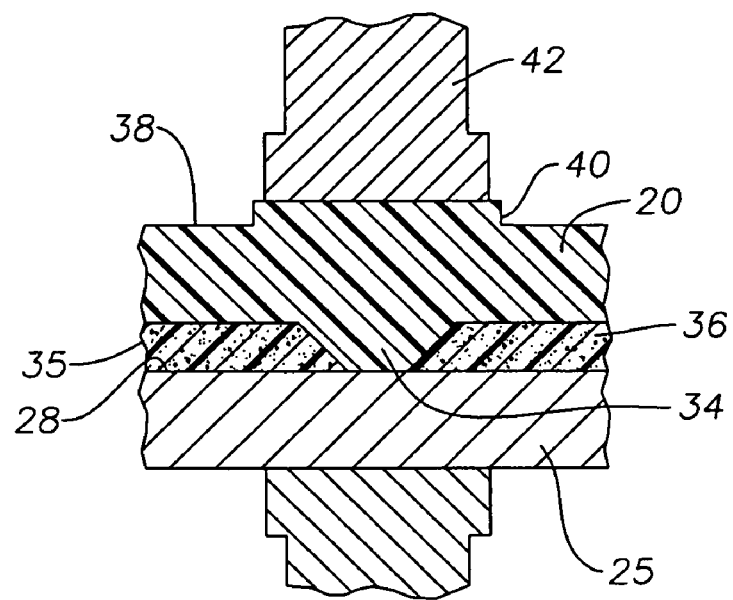
FIG. 6 is a sectional view of the overpress and frame of FIG. 1, taken along line 6-6 of FIG. 4.

Referring to FIGS. 5 and 6, an exemplary method of the present invention will be discussed. FIG. 5 illustrates a sectional view along line 5-5 of FIG. 4. In an exemplary embodiment, during operation, overpress inner surface 32 is placed adjacent frame member surface 28. The two respective surfaces never actually contact each other because nubs 34 contact frame member surface 28. This contact leaves a clearance 35 between overpress inner surface 32 and frame member surface 28, which is filled with liquid resin 36, as illustrated in FIG. 6 along line 6-6 of FIG. 4.

Figure 7:
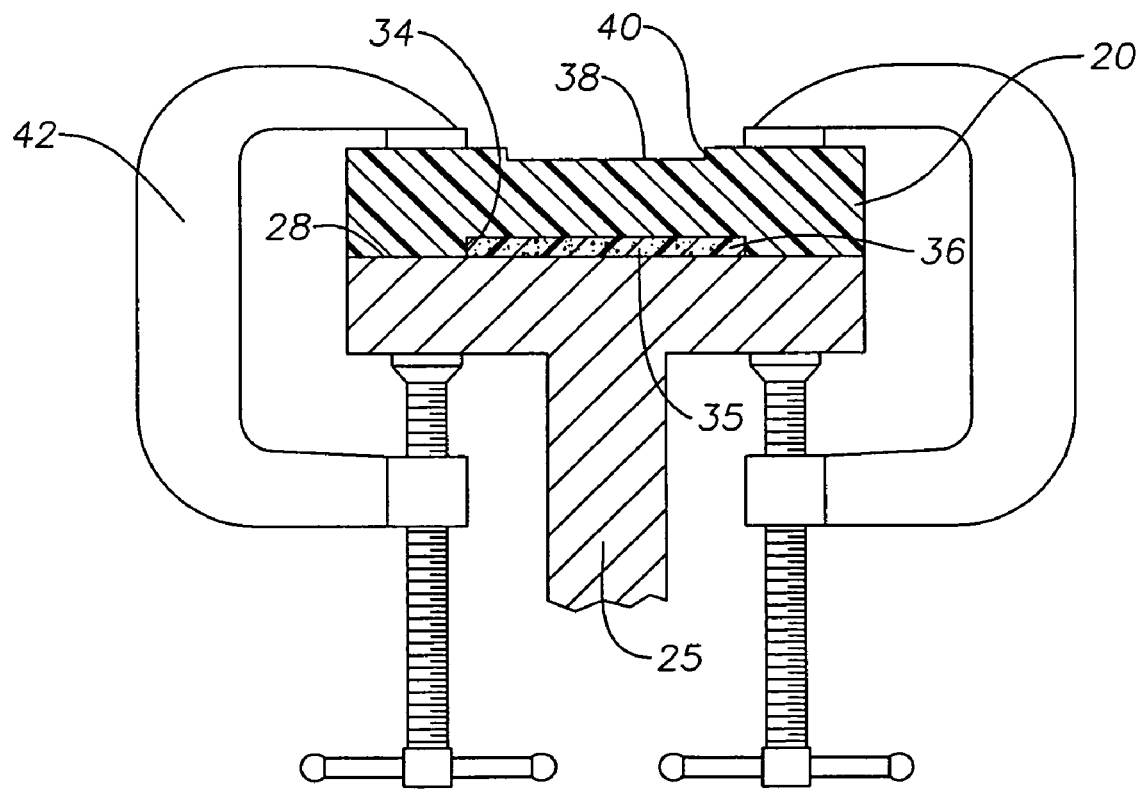
FIG. 7 is a sectional view of the overpress and frame of FIG. 1, taken along line 7-7 of FIG. 4.

FIG. 7 illustrates a sectional view along line 7-7 of FIG. 4. Here, overpress 20 has been attached to frame member 25 with nubs 34 contacting frame member surface 28. Clamps 42 have been attached and tightened against indicators 40, thereby leaving a uniform thickness for clearance 35. The resin 36 from the bead evenly spreads throughout clearance 35. In an exemplary embodiment, once liquid resin 36 has cured, overpress 20 can be removed using pull tabs 30, thereby leaving a uniform, constant thickness layer of cured resin bound to frame member surface 28. As illustrated in FIG. 6, nubs 34 can have tapered side edges, which will help to minimize damaging the surrounding cured resin when overpress 20 is removed and minimizes air entrapment. The hollow spaces in cured resin layer 36 where nubs 34 located are filled by hand with epoxy or resin. The cured resin layer 36 is then machined to a lesser thickness before application of the skin, such as for an aircraft panel, on top of the cured layer. The skin will be in flush contact with resin layer 36, which acts as a shim.

Figure 8:
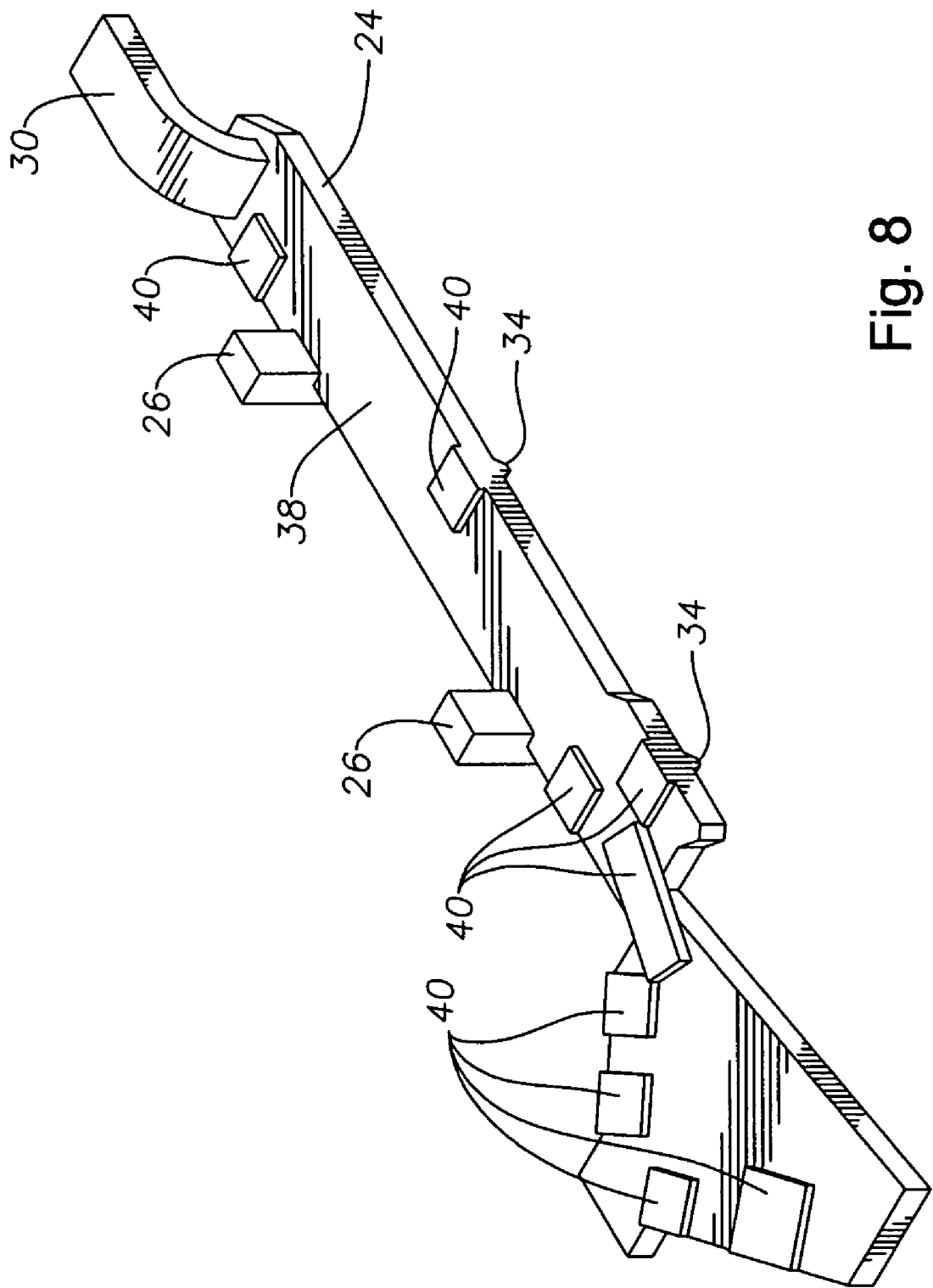
FIG. 8 is a perspective view of another overpress constructed in accordance with the invention.

FIG. 8 illustrates another exemplary embodiment of the present invention. Here, overpress 20 is shown with a plurality of indicators 40 for clamps 42 extending all along overpress outer surface 28. In this embodiment, only one pull tab 30 is included, which is located at the upper end of overpress 20 preferably. Pull tab 30 forms part of overpress 20 and extends from overpress outer surface 38 in a direction parallel to the axis of overpress 30. Also, reflecting the fact overpress 20 can be shaped to mirror any desired frame member, in this embodiment, overpress 20 is illustrated having a shape which conforms to the shape of its intended frame member.

Any variety of modeling techniques can be used to form overpress 20. In an exemplary embodiment, overpress 20 is creating using a direct manufacturing method called stereolithography. Overpress 20 is modeled in a Computer-Aided Design/Computer-Aided Manufacturing ("CAD/CAM") system and fabricated from a flexible epoxy resin, which is cured to a desired shape using a numerically controlled laser which "builds" overpress 20 from the uncured resin. Other methods considered within the scope of this invention can include, but are not limited to, fused deposition modeling ("FDM") selective laser sintering ("SLS"), and other similar methods.

This invention has numerous advantages. By applying liquid resin to the overpress inner surface 32, then clamping the overpress to the frame member, it is easy and efficient to form a resin layer on the frame member, whether it be horizontal, vertical, or overhead. Using the present invention reduces waste and is cleaner than the prior art method. If a translucent material is used to form the overpress, it is easy to determine if there is enough resin to fully fill the clearance.

In addition, in the event of needed reworking, the present invention reduces the amount of surface preparation required to repair thin areas. By keeping the overpress in place on the liquid resin during curing, it is not exposed to the air and, therefore, there is no amine carbonate reaction and thus, no expensive sanding is needed. With the present invention, the cured resin surface simply requires a quick scuff with an abrasive pad and a wipe with a clean dry cloth prior to adding any additional material. The voids in the hardened cured resin can then be filled, along with any other voids or possible air entrapments. An additional advantage of the present invention is that parallel work can be performed during the curing cycle since the uncured liquid resin is protected by the overpress.

While this invention has been shown in only one of its forms, it should be apparent to those skilled in the art that it is not so limited but is susceptible to various changes without departing from the spirit and scope of the invention. In the drawings and specification, there have been disclosed illustrative embodiments of the invention and, although specific terms are employed, they are used in a generic and descriptive sense only and not for the purpose of limitation, the scope of the invention being set forth in the following claims.

We claim:

1. A method for placing a resin layer on a selected surface of a metal frame member of an aircraft, the method comprising the steps of:
   (a) providing an overpress having an inner surface with a plurality of nubs protruding therefrom;
   (b) placing liquid resin on one of the surfaces of the overpress or the frame member; then
   (c) forcing the nubs of the overpress in contact with the selected surface of the frame member, causing the liquid resin to spread across the said one of the surfaces and allowing the nubs to define a clearance between the overpress and the frame member that fills with the liquid resin; then
   (d) allowing the liquid resin to cure into a layer of cured resin that bonds to the frame member, then removing the overpress from the selected surface of the frame member and the layer of cured resin; and
   (e) leaving the layer of cured resin bonded to the selected surface of the frame member, the layer of cured resin having hollow spaces where the nubs previously were located.

2. The method of claim 1, wherein step (c) comprises manually securing the overpress to the frame member with one or more clamps.

3. The method of claim 1, wherein step (a) further comprises forming the nubs so that the nubs are staggered in relation to each other along a length of the overpress such that a line between any two adjacent nubs is not parallel to any side of the overpress.

4. The method of claim 3, wherein step (a) further comprises forming the nubs whereby a length of the nubs is less than a width of the overpress.

5. The method of claim 1, wherein step (d) further comprises the step of applying a release agent coating on the overpress to facilitate removing the overpress from the layer of cured resin after the liquid resin has cured.

6. The method of claim 1, wherein step (a) further comprises the step of forming the overpress with a translucent material and step (b) further comprises the step of utilizing a liquid resin that is visible through the overpress.

7. The method of claim 1, further comprising the step of machining the layer of cured resin to a lesser thickness after removal of the overpress and while the layer of cured resin remains bonded to the frame member.

8. The method of claim 1, wherein step (a) further comprises the step of forming a guide member on a lateral edge of the overpress, the guide member protruding from the inner surface of the overpress, and wherein step (c) further comprises the step of abutting the guide member against an edge of the frame member.

9. The method of claim 1, comprising filling the hollow spaces in the layer of cured resin.

10. A method for placing a resin layer on a selected surface of a metal frame member of an aircraft, the method comprising the steps of:
    (a) providing an overpress having an inner surface and one or more lateral edges, the overpress further having a plurality of nubs protruding from the inner surface of the overpress, the nubs located at the lateral edges;
    (b) placing liquid resin on the inner surface of the overpress; then
    (c) forcing the nubs of the overpress in contact with the selected surface of the frame member by securing a plurality of clamps between the overpress and the frame member, the nubs defining a clearance between the overpress and the frame member;
    (d) after the liquid resin has cured, removing the overpress from the selected surface of the frame member, thereby, leaving a layer of cured resin bonded to the selected surface of the frame member, the layer of cured resin having hollow spaces where the nubs were previously located; then
    (e) filling the hollow spaces with a resin or an epoxy and machining the layer of cured resin while remaining bonded to the frame member.

11. The method of claim 10, wherein step (a) further comprises forming the nubs so that they are staggered in relation to each other along a length of the overpress such that a line between at least two nubs is not parallel to any side of the overpress.

12. The method of claim 10, wherein step (a) further comprises forming overpress of a flexible epoxy resin.

13. The method of claim 10, wherein step (a) further comprises the step of forming a plurality of indicators on an outer surface of the overpress, each of the indicators being located opposite one of the nubs; and step (c) comprises contacting one leg of each of the clamps to one of the indicators so as to exert a clamping force directly through each of the nubs against the frame member.

14. The method of claim 10, wherein step (a) further comprises the step of forming one or more pull tabs on the overpress and step (d) comprises grasping the pull tab to pull the overpress from the cured resin layer bonded to the frame member.

15. The method of claim 10, wherein step (a) further comprises the step of forming tapered edges on the nubs.

16. A method of attaching a composite skin to a metal frame member of an aircraft, the method comprising the steps of:

(a) providing an overpress having an inner surface with a plurality of nubs protruding therefrom at a uniform distance from the inner surface;

(b) placing a bead of liquid resin on the inner surface of the overpress between the nubs; then (c) clamping the nubs of the overpress in contact with the selected surface of the frame member, the nubs defining a clearance between the overpress and the frame member into which the bead of liquid resin spreads;

(d) allowing the liquid resin to cure into a layer of cured resin with a thickness the same as the clearance, then removing the overpress from the selected surface of the frame member and the layer of cured resin, thereby leaving the layer of cured resin bonded to the selected surface of the frame member, the layer of cured resin having hollow spaces previously occupied by the nubs;

(e) filling the hollow spaces with a resin or epoxy, then machining the layer of cured resin to a lesser thickness while the layer of cured resin remains bonded to the frame member; then (f) attaching the skin to the frame member of the aircraft, the layer of cured resin being between the skin and the frame member.

17. The method of claim 16, wherein step (a) further comprises forming the nubs whereby a length of the nubs is less than a width of the overpress.

18. The method of claim 16, wherein step (b) further comprises the step of applying a release agent to the inner surface of the overpress prior to applying the bead of liquid resin.

19. The method of claim 16, wherein step (a) further comprises the step of forming the overpress with a translucent material and step (b) further comprises the step of utilizing a liquid resin that is visible through the overpress.

20. The method of claim 16, further comprising forming the overpress of a flexible material.

\* \* \* \* \*